(12) United States Patent
Rezaei et al.

(10) Patent No.: US 10,041,461 B2
(45) Date of Patent: Aug. 7, 2018

(54) SYSTEM AND METHOD FOR VALVE SEATING DETECTION

(71) Applicant: Caterpillar Inc., Peoria, IL (US)

(72) Inventors: Morteza Rezaei, Peoria, IL (US); Ioan Paduret, Peoria, IL (US); James Siegle, Washington, IL (US)

(73) Assignee: Caterpillar Inc., Deerfield, IL (US)

( * ) Notice: Subject to any disclaimer, the term of this patent is extended or adjusted under 35 U.S.C. 154(b) by 0 days.

(21) Appl. No.: 15/380,465

(22) Filed: Dec. 15, 2016

(65) Prior Publication Data

US 2018/0171955 A1   Jun. 21, 2018

(51) Int. Cl.
| | |
|---|---|
| *F16K 37/00* | (2006.01) |
| *F02M 65/00* | (2006.01) |
| *F02M 63/00* | (2006.01) |
| *F02M 21/02* | (2006.01) |

(52) U.S. Cl.
CPC .......... *F02M 65/005* (2013.01); *F02M 21/02* (2013.01); *F02M 63/0015* (2013.01); *F02M 63/0054* (2013.01); *F16K 37/0041* (2013.01); *F02D 2200/063* (2013.01); *Y10T 137/8242* (2015.04)

(58) Field of Classification Search
CPC .......... Y10T 137/8242; F16K 37/0041; F02M 65/005; F02D 2200/063
See application file for complete search history.

(56) References Cited

U.S. PATENT DOCUMENTS

| | | | |
|---|---|---|---|
| 4,941,348 A | * | 7/1990 | Hock ............ G01P 13/00 324/654 |
| 5,650,909 A | | 7/1997 | Remele et al. |
| 5,947,090 A | | 9/1999 | Maeda |
| 6,128,175 A | | 10/2000 | Wright et al. |
| 2001/0015196 A1 | | 8/2001 | Marumoto et al. |
| 2005/0146408 A1 | * | 7/2005 | Traversa ........ F02D 41/20 335/220 |
| 2011/0251777 A1 | * | 10/2011 | Farah ............ F02D 41/30 701/103 |
| 2015/0256114 A1 | * | 9/2015 | Sanchez Gonzalez . F02D 41/20 318/128 |
| 2015/0308399 A1 | | 10/2015 | Hoban et al. |

FOREIGN PATENT DOCUMENTS

| | | |
|---|---|---|
| JP | H07127552 A | 5/1995 |
| WO | 2013191267 A1 | 12/2013 |

* cited by examiner

*Primary Examiner* — Atif Chaudry
(74) *Attorney, Agent, or Firm* — Mattingly Burke Cohen & Biederman; James S. Bennin

(57) ABSTRACT

A system for detecting valve seating in a valve system such as a fuel admission valve system includes seat detection circuitry coupled with a low-side driver circuit in solenoid actuator circuitry for the valve system. The seat detection circuitry includes a voltage probe for sensing voltage in the solenoid actuator circuitry, delay circuitry, and a comparator coupled with the delay circuitry and the voltage probe and having an output dependent upon change in the sensed voltage over time. A timing of voltage changes is observed to enable valve seating detection.

19 Claims, 3 Drawing Sheets

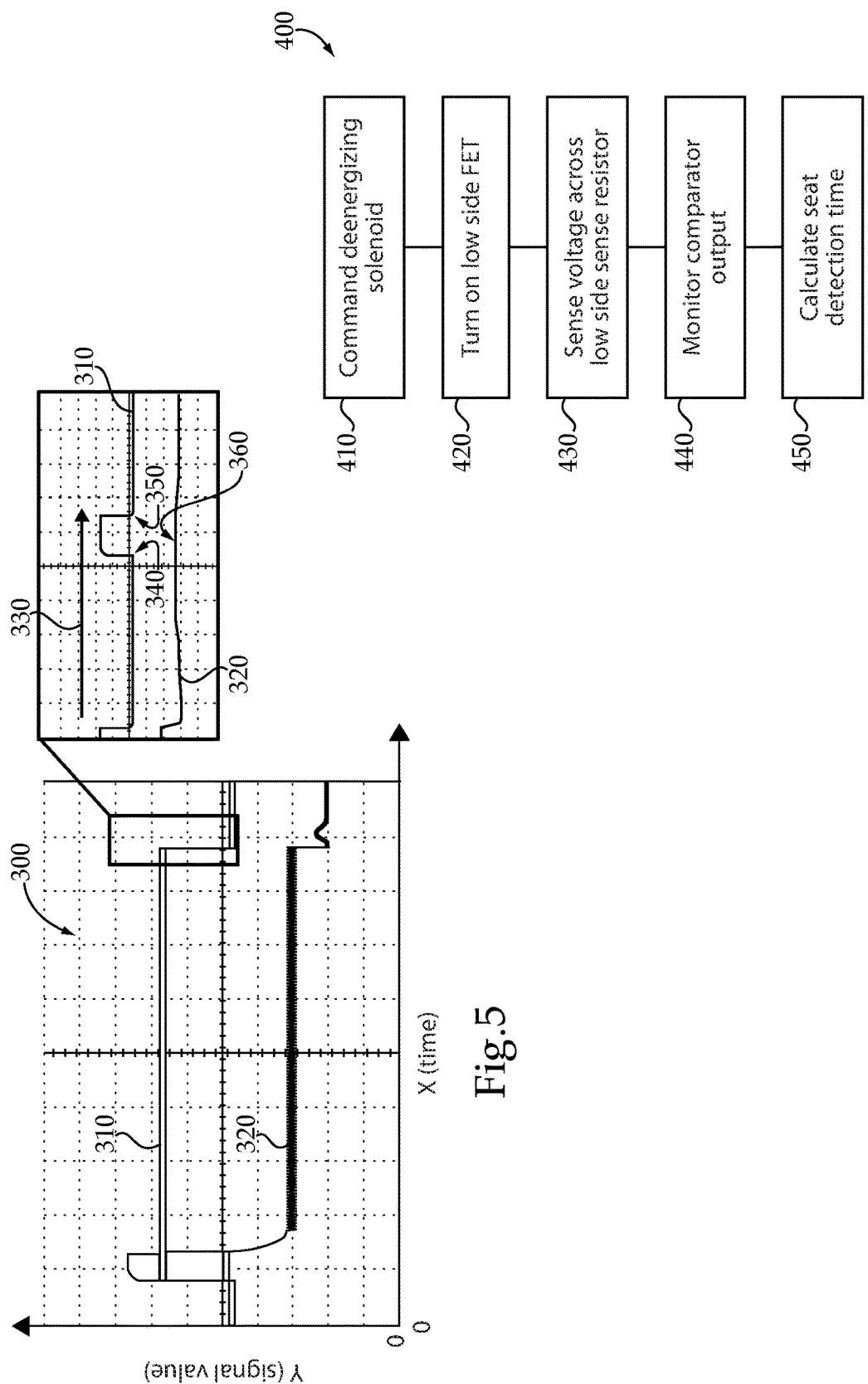

SYSTEM AND METHOD FOR VALVE SEATING DETECTION

TECHNICAL FIELD

The present disclosure relates generally to valve seating detection, and more particularly to valve seating detection by way of sensing voltage in solenoid circuitry of an electrical actuator in a valve mechanism.

BACKGROUND

Electrically actuated valves are used in a wide variety of modern commercial and industrial machines. Notable among such applications are those associated with internal combustion engines. In an internal combustion engine fuel system, for example, various pumps and fuel injectors or other fuel admission valves can employ electrical actuators for controlling fluid communication between two fluid conduits. It is common for such electrical actuators to include a solenoid in a valve body, operably coupled with an armature attached to a valve member whose position is desired to be controlled. Energizing of the solenoid causes the armature to move toward the solenoid, whereas deenergizing the solenoid enables the armature and valve member to move away from the solenoid, according to well-known principles. Biasers such as biasing springs and/or hydraulic biasers are employed to assist in controlling the position of the valve member. These electrically actuated valves, to control the admission of a liquid or a gaseous fuel, can be coupled with an intake conduit feeding a mixture of the fuel and air to an engine cylinder, or the fuel can be delivered directly into an engine cylinder.

The foregoing and other types of electrically actuated valve systems often require that valves move relatively quickly and repetitively. Because the travel speed of a valve member as well as the valve opening time tends to affect the rate of fuel delivery, it is generally desirable for valve motion to be relatively tightly controlled. Engineers have discovered that it is relatively straightforward to control the time at which an electrical actuator is energized, therefore a valve opening time can be relatively precisely controlled in many instances. It tends to be more challenging to precisely control a valve closing time, as a valve member returning toward a valve seat can have a travel speed and therefore valve closing time that is less predictable for a variety of reasons.

Many modern engine systems, and other mechanical systems employing electrically actuated valves, utilize sophisticated electronic control modules (ECMs). Engineers have experimented literally for decades, exploiting the capabilities of computer control and analysis, as to how to best detect the time at which a valve member "seats." One known technique relates to sensing an electrical current property in the solenoid circuitry that is induced after the circuit is turned off. United States Patent Application Publication No. 2015/0308399A1 to Hoban Jr. et al. describes a strategy for electronic control of valves that provides for seat detection under such circumstances.

In general terms, when a circuit energizing a solenoid in the circuitry is turned off and the associated armature travels away from the solenoid toward a seated position, closing a valve seat and stopping fluid flow out of the valve, an induced electrical current may exhibit certain properties at or close to the point in time at which the valve member stops its travel upon reaching the seat. While these principles have been exploited successfully, some known techniques are relatively computationally intensive.

SUMMARY OF THE INVENTION

In one aspect, a valve seating detection mechanism includes a voltage probe configured to couple with solenoid circuitry in an electrical actuator for a valve to sense voltage in the solenoid circuitry. The mechanism further includes delay circuitry coupled with the voltage probe, and a comparator. The comparator is coupled with the voltage probe to receive a first input indicative of voltage in the solenoid circuitry at a first time, and coupled with the delay circuitry to receive a second input indicative of voltage in the solenoid circuitry at a second time that is earlier than the first time. The mechanism further includes a control mechanism configured to determine a time of seating of the valve based on an output of the comparator that varies depending upon a difference between the voltage in the solenoid circuitry at the first time and the voltage in the solenoid circuitry at the second time.

In another aspect, a method for valve seating detection includes sensing voltage in solenoid circuitry in an electrical actuator for a valve at a first time, and sensing voltage in the solenoid circuitry at second time that is earlier than the first time. The method further includes comparing the sensed voltage at the first time to the sensed voltage at the second time, and outputting a signal based on a difference between the voltage in the solenoid circuitry at the first time and the voltage in the solenoid circuitry at the second time. The method still further includes detecting seating of the valve based upon a timing of the signal.

In still another aspect, a valve system includes a valve body having a valve seat positioned fluidly between a fluid inlet and a fluid outlet, and a valve member movable within the valve body between a closed position in contact with the valve seat to block fluid communication between the fluid inlet and the fluid outlet, and an open position. An electrical actuator is coupled with the valve member to move the valve member between the closed position and the open position, and includes an armature, and solenoid circuitry having a solenoid positioned to inductively couple with the armature. The valve system further includes a seating detection mechanism including seating detection circuitry coupled with the solenoid circuitry and configured to sense voltage in the solenoid circuitry, and a control mechanism. The control mechanism is coupled with the seating detection circuitry and configured to determine a time of seating of the valve member at the closed position based upon a timing of a change in voltage in the solenoid circuitry.

BRIEF DESCRIPTION OF THE DRAWINGS

FIG. 5 is a graph of signal values over time during valve seating detection, according to one embodiment; and FIG. 6 is a flowchart illustrating example control logic flow in a seating detection strategy, according to one embodiment.

DETAILED DESCRIPTION

Figure 1:
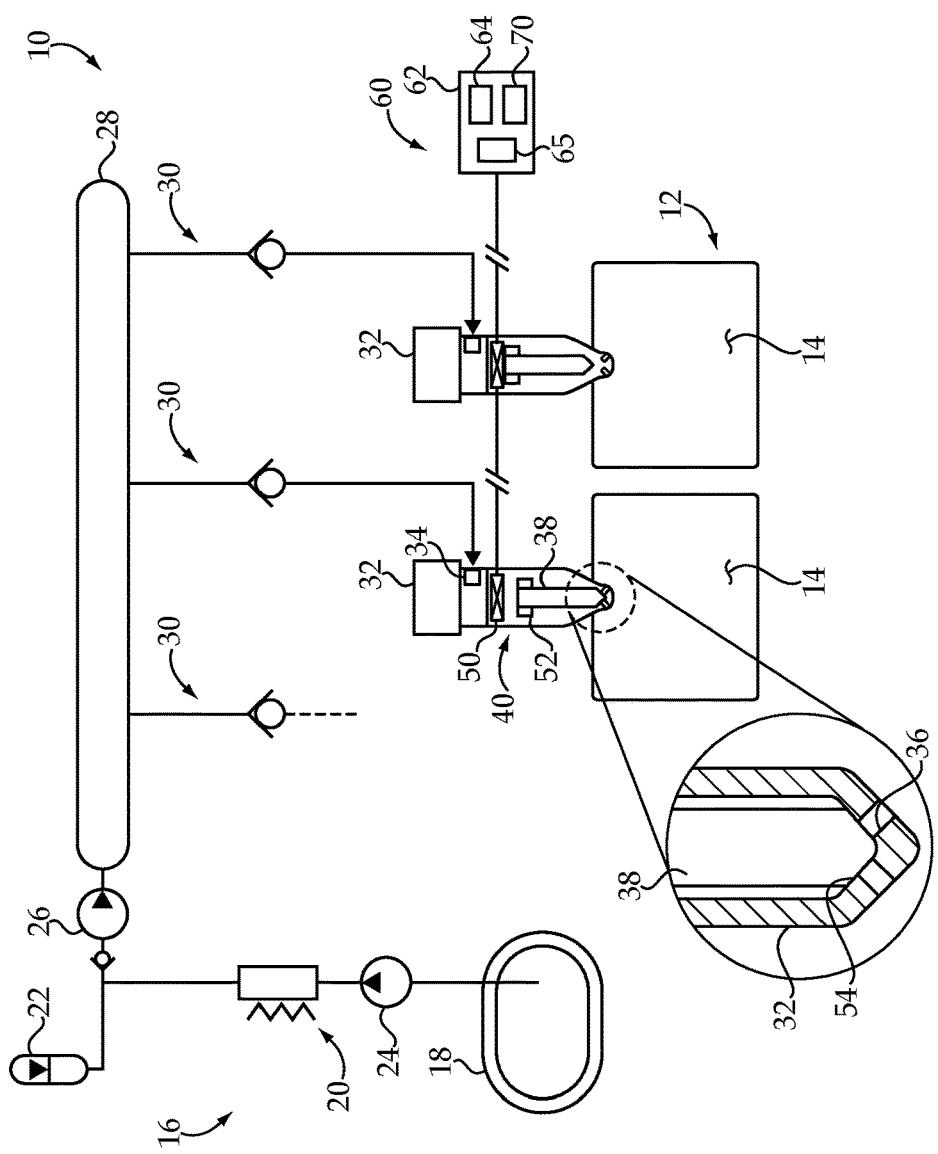
FIG. 1 is a diagrammatic view, including a detailed enlargement, of an internal combustion engine system according to one embodiment.

Referring to FIG. 1, there is shown an engine system 10, according to one embodiment. Engine system 10 includes an internal combustion engine 12 and a fuel system 16 coupled with internal combustion engine 12. Engine system 10 may operate on gaseous fuel, such as natural gas, propane, landfill gas and still others, although the present disclosure is not thereby limited. Fuel system 16 may include a fuel supply 18 such as a cryogenic liquid gaseous fuel storage vessel. A fuel transfer pump 24, a vaporizer 20, an accumulator 22, and a high pressure pump 26 may be coupled between fuel supply 18 and a gaseous fuel common rail 28. A plurality of fuel supply conduits 30 extend between gaseous fuel common rail 28 and a plurality of fuel injectors 32. Fuel injectors 32 may be substantially identical to one another, and thus descriptions herein of "a" fuel injector or "the" fuel injector in the singular should be taken to apply to such other fuel injectors as are part of fuel system 16. For purposes of the present description fuel injector 32 can be understood as one type of valve, in particular a fuel admission valve, and thus descriptions of fuel injector 32 should be understood to refer analogously to other valves that may benefit from applications of the teachings of the present disclosure, except where otherwise indicated. Likewise, descriptions of fuel system 16 can be understood to analogously apply to other valve systems contemplated herein.

Fuel injector 32 includes a valve body or fuel injector body 33 having formed therein a fluid inlet or fuel inlet 34 and at least one fluid outlet or fuel outlet 36 positioned to deliver a charge of fuel into a fluid space 14 of engine 12. In some embodiments, fluid space 14 includes an individual cylinder or precombustion chamber in engine 12. In other embodiments fluid space 14 could be a fluid conduit, such as an intake runner extending from an intake manifold (not shown) to a cylinder in internal combustion engine 12. A valve member in the nature of a nozzle check 38 is positioned within fuel injector 32 and is movable between a first or open position at which fuel inlet 34 is in fluid communication with fuel outlet 36, and a second or closed position at which nozzle check 38 is in contact with a valve seat 54 to block the one or more fuel outlets 36 from fluid communication with fuel inlet 34. An electrical actuator 40 including a solenoid coil 50 and an armature 52 coupled to nozzle check 38 is positioned within fuel injector 32 and can be energized to produce a magnetic field with solenoid 50 that draws armature 52 and nozzle check 38 from the seated or closed position toward the first or open position. When solenoid coil 50 is deenergized armature 52 and nozzle check 38 can move back toward the seated position, such as by way of a biasing spring (not shown).

A control system 60 is provided having an electronic control module or ECM 62. ECM 62 may include solenoid circuitry 64 structured for controllably energizing and deenergizing solenoid coil 50 in a generally known manner. ECM 62 also includes seating detection circuitry 70, structured to detect seating of nozzle check 38 in a manner further discussed herein. ECM 62 can be considered to be or to include a seating detection mechanism for purposes of the present disclosure. As will be further apparent from the following description, seating detection circuitry 70 is uniquely configured to achieve the aims of seating detection, enabling ECM 62 to determine various factors relating to the operation and health of fuel injector 32, such as aging state. While the present description is in the context of a gaseous fuel engine, and the teachings herein can be advantageously applied to a gaseous fuel engine, the present disclosure is not limited as such. Liquid fueled engines or dual fuel engines may also benefit from application of the present disclosure. Similarly, the present disclosure is not limited to the context of an internal combustion engine, as various other electrically actuated valve mechanisms and valve systems are known where valve seating detection with accuracy and precision is desirable without unduly intensive computational demands. A control device 65 such as a Field Programmable Gate Array (FPGA) 65 is coupled with each of solenoid circuitry 64 and seating detection circuitry 70.

Figure 2:
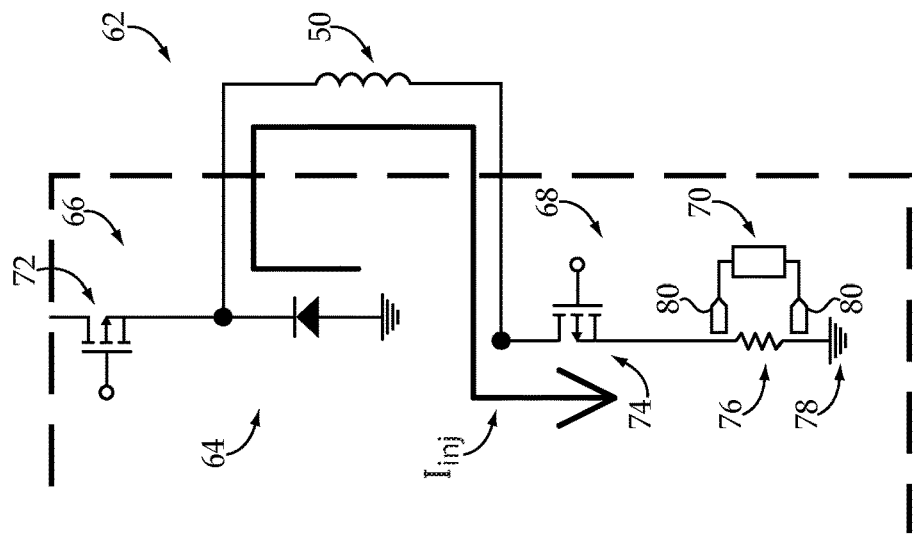
FIG. 2 is a schematic illustration of control system circuitry, according to one embodiment.

Referring now also to FIG. 2, there are shown certain components of ECM 62 in greater detail, including high-side driver circuitry 66 and low-side driver circuitry 68 of solenoid circuitry 64. High-side driver circuitry 66 includes a switching element 72 in the nature of a field effect transistor or "FET", whereas low-side driver circuitry 68 may include a low side FET 74. A solenoid energizing current $I_{inj}$ is depicted in FIG. 2 and represents a current pulse provided for a desired period of time to energize solenoid 50 and move nozzle check 38 away from its seated position and toward or to a fully open position. When energizing current $I_{inj}$ is halted the magnetic field produced by solenoid 50 begins to decay, and nozzle check 38 moves back toward its seated position. Low-side circuitry 68 also includes a ground 78 and a sense resistor 76. Seating detection circuitry 70 may be coupled with low-side driver circuitry 68 and configured to sense voltage in solenoid circuitry 64 such as voltage across sense resistor 76.

Figure 3:
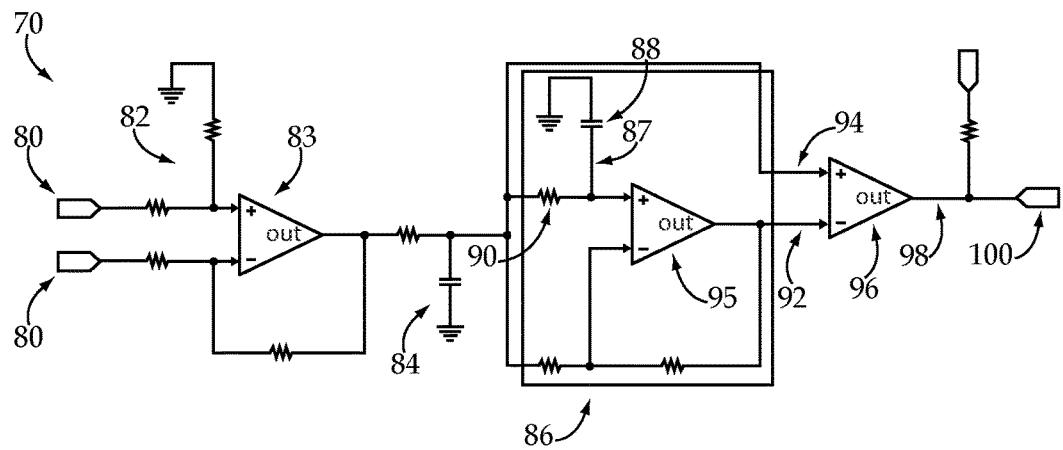
FIG. 3 is a schematic illustration of seating detection circuitry, according to one embodiment.

Referring now to FIG. 3, there is shown seat detection circuitry 70 in greater detail. A voltage probe(s) 80 is shown which can be coupled with solenoid circuitry 64 such as across sense resistor 76. A first amplifier 82 is provided to produce an amplified output representative of sensed voltage in solenoid circuitry 64. Amplifier 82 includes a first comparator 83, the output of which is filtered by way of a filter 84. Filter 84 may include a low-pass filter, the output of which is received by an amplifier 86. Amplifier 82 and filter 84 are coupled between voltage probe 80 and amplifier 86. Amplifier 86 includes delay circuitry 87 having a capacitor 88 and a resistor 90 and another comparator 95. It will be seen from FIG. 3 that an output of filter 84 is fed both to amplifier 86 and delay circuitry 87 also in parallel to yet another comparator 96. Comparator 96 can be seen to be coupled to voltage probe(s) 80 by way of filter 84 to receive a first input 94 that is indicative of sensed voltage in solenoid circuitry 64. Comparator 96 can also be seen to be coupled to delay circuitry 87 to receive a second input 92 that is indicative of sensed voltage in solenoid circuitry 64. First input 94 may be indicative of sensed voltage in solenoid circuitry at a first time. Second input 92 may be indicative of sensed voltage in solenoid circuitry at a second time that is earlier than the first time due to the delay imposed by delay circuitry 87. Those skilled in the art will appreciate that the resistance of resistor 90 and the capacitance of capacitor 88 as well as potentially other variables can be adjusted to vary the delay time imposed by delay circuitry 87. In this regard, the first time may be referred to as a later time and the second time may be referred to as a later time. It will further be appreciated that a variety of different types of delay circuitry, filtering circuitry, and other components could be provided within the context of the present disclosure. The depiction in FIG. 3 is diagrammatic only and numerous modifications, and additions, will be apparent to those who are skilled in the art. It will, regardless, be understood that an output 98 of comparator 96 may vary depending generally upon whether voltage in solenoid circuitry is increasing or decreasing. Put differently, comparator 96 will have a first comparator output where the presently sensed voltage indicated by input 94 is greater than the previously sensed voltage indicated by input 92, and a second comparator output where the presently sensed voltage indicated by input 94 is greater than the previously sensed voltage indicated by input 92. Comparator output 98 is read by way of control mechanism 65 of ECM 62 at connector 100 and produces one of two possible outputs. It will therefore be understood that a change in voltage in solenoid circuitry 64 from increasing or stable to stable or decreasing, respectively, or vice versa, can be represented as a single bit of information. The timing of producing comparator output 98, or more particularly a timing of a change in comparator output 98, is used by control mechanism 65 to detect seating of a valve. In the case of fuel system 16 the valve or valve member whose seating is detected is nozzle check 38, however, as discussed herein other valve types within a fuel system or other types of valve systems are contemplated.

Figure 4:
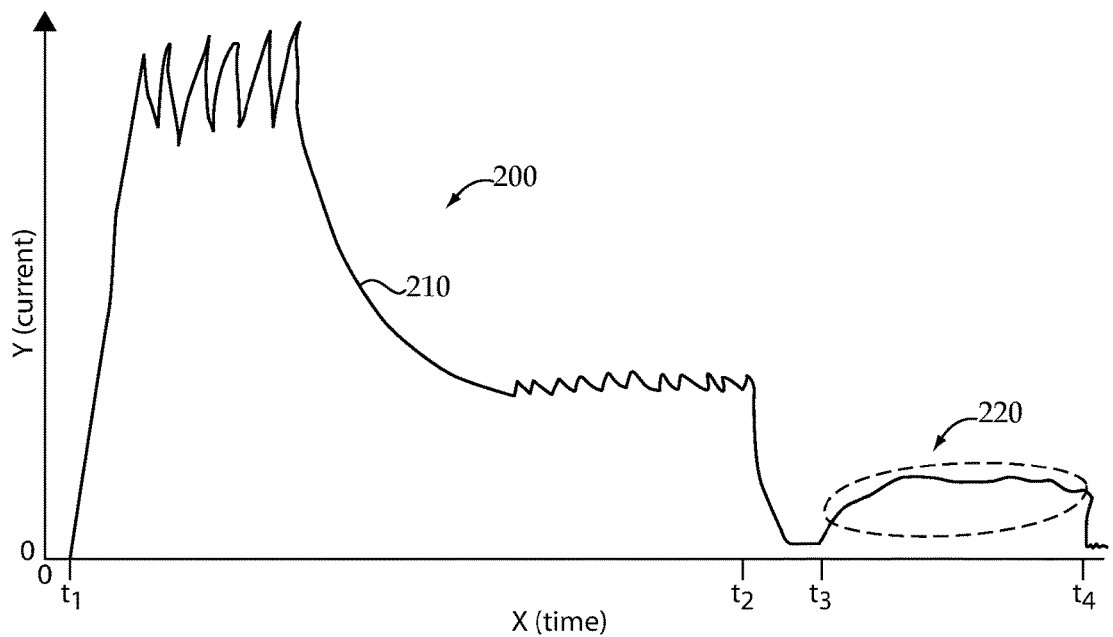
FIG. 4 is a graph of electrical current during valve seating detection, according to one embodiment.

Referring also now to FIG. 4, there is shown a graph 200 where electrical current is depicted on the Y-axis and time depicted on the X-axis. In graph 200, a signal trace 210 represents electrical current through solenoid circuitry 64 over time, as it might appear during energizing solenoid 50 at approximately a time $t_1$ such as by turning on FET 72 and FET 74, and turning off FET 72 and FET 74 at a time $t_2$ to begin deenergizing solenoid circuitry 64. When FET 72 and FET 74 are turned off to begin deenergizing solenoid circuitry 64 current $I_{inj}$ will begin to decay, and then bottoms out until approximately a time t3. At time t3, electrical current is induced in solenoid circuitry 64 by way of commencing of the travel of nozzle check 38 from an open position back toward a closed position. This induced electrical current can be observed generally in a zone 220 from approximately time t3 to approximately time t4. Measuring voltage by way of seat detection circuitry 70 as discussed herein in zone 220 enables detection of the precise moment in time at which nozzle check 52 comes to rest against seat 54, and does so without requiring excessive computation such as pattern matching. The time that it takes for nozzle check 38 to travel from an open position to its closed position can be used for various diagnostic and/or control purposes. In instances where an aging state of fuel injector 32 or components of fuel injector 32 such as electrical actuator 40 is desired to be known, a time for nozzle check 38 to travel from an open position to its closed position can be indicative of approximately where electrical actuator 40 and thus fuel injector 32 is in an expected service life. In most instances, a relatively greater time for nozzle check 38 to reach its closed position can be associated with a relatively greater aging state and therefore reduced expected time until the end of its expected service life. The present disclosure is not thereby limited, however, and various other valve systems could exhibit different aging characteristics in relation to different times for a valve member to reach a seated position. In a practical implementation, control mechanism 65 can be configured to clock a time for a valve such as nozzle check 38 to travel from an open position to a closed position blocking valve seat 54 based on a determined time of seating. Control mechanism 65 may be further configured to start the clocking of the time for a valve to travel from the open position to a closed position responsive to deenergizing of solenoid circuitry 64. Control mechanism 65 may be still further configured to compare the clocked time with a stored reference time, and to produce a diagnostic signal that can be stored in local computer memory, for instance, that is indicative of an aging state of electrical actuator 40, based on the comparison. As it can also be desirable to control valve closing time relatively precisely to provide a relatively precise timing of an end of injection in a fuel system, the timing of energizing solenoid circuitry 64 and/or deenergizing solenoid circuitry 64 can be varied to produce a desired timing of valve seating once the benefit of a determined time to valve seating becomes available.

Turning now to FIG. 5, there is shown another graph 300 showing signal value on the Y-axis and time on the X-axis, with a first signal trace 310 representing comparator output shown in relation to a second signal trace 320 representing electrical current. A portion of graph 300 is also depicted in a detailed enlargement where a time to seat detection is shown via 330, and also comparator output 310 and electrical current 320. In electrical current signal trace 320, a current pulse or hump 360 can be seen with the reference numeral lead line pointing approximately to a peak of hump 360. It can also be seen that comparator output 310 flips a first time at a point 340 and flips again a second time at a point 350. Some delay between changes in voltage in solenoid circuitry 64 and flipping of comparator output 96 can be expected to naturally occur, and are evident in FIG. 5. The peak of hump 360 is generally considered the instant at which valve seating occurs, and it can thus be seen that flipping point 340 occurs just prior to the peak of hump 360 and flipping point 350 occurs just subsequent to the peak of hump 360. Changing polarity of voltage in solenoid circuit 64 occurs between the earlier time of flipping point 340 and the later time of flipping point 350. By observing comparator output 98 a change in voltage can be detected approximately as hump 360 begins to level off prior to occurrence of the peak in hump 360, and another change in voltage detected subsequent to occurrence of the peak in hump 360. Control mechanism 65 will typically, but not necessarily, start clocking the time to seating of a valve when FET 72 and FET 74 are turned off, and stop clocking the time when flipping of comparator output at point 350 is detected.

INDUSTRIAL APPLICABILITY

Referring to the drawings generally, but in particular now to FIG. 6, there is shown a flowchart 400 illustrating example control logic flow, according to one embodiment. At block 410, control mechanism 65 may be operated to command deenergizing solenoid 50, such as by turning off FET 72 and FET 74. With each of FET 72 and FET 74 turned off, current $I_{inj}$ will begin to decay, approximately what might be observed beginning about time $t_2$ in FIG. 4. Shortly after turning off FET 72 and FET 74, the logic may advance to block 420 to turn on low-side FET 74. From block 420, the logic may advance to block 430 to sense voltage across low-side sense resistor 76. From block 430, the logic may advance to block 440 to monitor comparator output. At block 440 control mechanism 65 may observe comparator output for the pattern of flipping twice in relatively short succession that indicates occurrence of the peak in current pulse or hump 360. From block 440 the logic may advance to block 450 to detect valve seating.

It should be appreciated that the calculation of seat detection time can be based on clocking a time from a selected beginning time to an end time that is indicated by way of the flipping of the output of comparator 96 such as at point 350 shown in FIG. 5. In most instances point 350 and point 340 can be considered suitably close enough to the precise moment at which valve seating occurs for diagnostic and/or control purposes. In other instances an offset might be calculated. The beginning of the time period for determining seat detection could be a time from turning off FET 72 and FET 74, which will typically occur simultaneously, or the beginning time for the calculation of seat detection could commence at some more or less arbitrarily selected time following the turning off of FET 72 and FET 74. It should also be appreciated that diagnostics might run continuously or periodically over the course of a service life of engine system 10, or in other instances diagnostics might be run only when engine system 10 is brought in for servicing. It will therefore be appreciated that the present disclosure contemplates application as a service tool, as a real-time mechanism for varying an operating scheme based upon valve seating times, as well as for purposes of gathering historical information to enable identification of trends in valve seating time over the course of a service life of an electrical actuator and associated components in a valve system.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:

1. A valve seating detection mechanism comprising:
a voltage probe configured to couple with solenoid circuitry in an electrical actuator for a valve to sense voltage in the solenoid circuitry;
delay circuitry coupled with the voltage probe;
a comparator coupled with the voltage probe to receive a first input indicative of voltage in the solenoid circuitry at a first time, and coupled with the delay circuitry to receive a second input indicative of voltage in the solenoid circuitry at a second time, wherein the second time is earlier than the first time; and
a control mechanism configured to:
determine a time of seating of the valve based on an output of the comparator that varies depending upon a difference between the voltage in the solenoid circuitry at the first time and the voltage in the solenoid circuitry at the second time,
wherein, when determining the time of seating of the valve, the control mechanism is to:
detect flipping the output of the comparator a first time and flipping the output of the comparator a second time, and
determine the time of seating of the valve based on flipping of the output of the comparator the first time and flipping of the output of the comparator the second time,
wherein flipping of the output of the comparator the first time and flipping of the output of the comparator the second time are indicative of a change in polarity of voltage in the solenoid circuitry.

2. The mechanism of claim 1 wherein the control mechanism is further configured to clock a time for the valve to travel from an open position relative to a valve seat to a closed position blocking the valve seat, based on the determined time of seating.

3. The mechanism of claim 2 wherein the control mechanism is further configured to start the clocking of the time for the valve to travel from the open position to the closed position responsive to deenergizing of the solenoid circuitry.

4. The mechanism of claim 3 wherein the control mechanism is further configured to compare the clocked time for the valve to travel with a stored reference time, and to produce a signal indicative of an aging state of the electrical actuator based on the comparison.

5. The mechanism of claim 1 further comprising an amplifier and a filter coupled between the voltage probe and the delay circuitry, the amplifier being configured to amplify a sensed voltage across a resistor in a low-side driver circuit of the solenoid circuitry and the filter being configured to filter an output of the amplifier.

6. The mechanism of claim 5 wherein the delay circuitry includes a second comparator, and a capacitor coupled to an input of the comparator.

7. The mechanism of claim 1 wherein the valve includes a fuel admission valve in an internal combustion engine.

8. A method for valve seating detection, the method comprising:
sensing voltage in solenoid circuitry in an electrical actuator for a valve at a first time;
sensing voltage in the solenoid circuitry at a second time, wherein the second time is earlier than the first time;
comparing the sensed voltage at the second time to the sensed voltage at the first time;
outputting a signal based on a difference between the voltage in the solenoid circuitry at the second time and the voltage in the solenoid circuitry at the first time,
wherein outputting of the signal includes flipping the output of a comparator in response to a change in voltage in the solenoid circuitry induced by travel of the valve from an open position to a closed position, and
wherein flipping of the output includes flipping the output prior to and after occurrence of a peak in a current pulse induced in the solenoid circuitry by the travel of the valve; and
detecting seating of the valve based upon a timing of the signal.

9. The method of claim 8 wherein the sensing of the voltage in the solenoid circuitry at the first time and the sensing of the voltage in the solenoid circuitry at the second time each include sensing the voltage across a sense resistor in a low-side driver circuit of the solenoid circuitry.

10. The method of claim 9 wherein the valve includes a fuel admission valve in an internal combustion engine.

11. The method of claim 10 further comprising clocking a time for the valve to travel from the open position to the closed position, and starting the clocking of the time for the valve to travel responsive to deenergizing the solenoid circuitry to end a fuel admission event.

12. The method of claim 11 further comprising comparing the clocked time for the valve to travel with a stored reference time, and outputting a signal indicative of an aging state of the electrical actuator based on the comparison.

13. A valve system comprising:
a valve body including a valve seat positioned fluidly between a fluid inlet and a fluid outlet;
a valve member movable within the valve body between a closed position in contact with the valve seat to block fluid communication between the fluid inlet and the fluid outlet, and an open position;
an electrical actuator coupled with the valve member to move the valve member between the closed position and the open position, and including an armature, and solenoid circuitry including a solenoid positioned to inductively couple with the armature; and a seating detection mechanism including seating detection circuitry coupled with the solenoid circuitry and configured to sense voltage in the solenoid circuitry, and a control mechanism;

the control mechanism being coupled with the seating detection circuitry and configured to determine a time of seating of the valve member at the closed position based upon a timing of a change in voltage in the solenoid circuitry, wherein, when determining the time of seating of the valve, the control mechanism is to:

determine the time of seating of the valve based on voltage in the solenoid circuitry being flipped a first time and being flipped a second time, wherein the flipping of the voltage in the solenoid circuitry being flipped the first time and being flipped the second time is indicative of a change in polarity of voltage in the solenoid circuitry.

14. The valve system of claim 13 wherein the solenoid circuitry includes a high-side driver circuit and a low-side driver circuit, and the seating detection circuitry is coupled with the low-side driver circuit.

15. The valve system of claim 14 wherein the valve member includes an outlet check in a fuel admission valve.

16. The valve system of claim 13 wherein the control mechanism is further configured to clock a time for the valve to travel from the open position to the closed position.

17. The valve system of claim 16 wherein the control mechanism is further configured to start the clocking of the time for the valve to travel responsive to deenergizing the solenoid circuitry to end a fuel admission event.

18. The valve system of claim 16 wherein the control mechanism is further configured to compare the clocked time, for the valve to travel, with a stored reference time, and to produce a signal indicative of an aging state of an electrical actuator, of the solenoid circuitry, based on the comparison.

19. The valve system of claim 13 wherein the valve member includes a fuel admission valve in an internal combustion engine.

* * * * *